(12) United States Patent
Sukenari et al.

(10) Patent No.: US 7,710,497 B2
(45) Date of Patent: May 4, 2010

(54) VISUAL PRESENTER

(75) Inventors: Kazuhiro Sukenari, Nagoya (JP); Hiroshi Yamakose, Gifu (JP); Shinji Ono, Nagoya (JP)

(73) Assignee: Elmo Co., Ltd., Aichi (JP)

( * ) Notice: Subject to any disclaimer, the term of this patent is extended or adjusted under 35 U.S.C. 154(b) by 501 days.

(21) Appl. No.: 11/702,468

(22) Filed: Feb. 5, 2007

(65) Prior Publication Data

US 2007/0279519 A1 Dec. 6, 2007

(30) Foreign Application Priority Data

Jun. 5, 2006 (JP) ............................. 2006-155938

(51) Int. Cl.
*H04N 5/225* (2006.01)
(52) U.S. Cl. ...................... 348/375; 348/373
(58) Field of Classification Search ................. 348/373, 348/375, 376; 396/419, 422, 428
See application file for complete search history.

(56) References Cited

U.S. PATENT DOCUMENTS

| | | | | |
|---|---|---|---|---|
| 5,751,355 A | * | 5/1998 | Bito et al. .................... | 348/375 |
| 6,317,155 B1 | * | 11/2001 | Ohyama ..................... | 348/373 |
| 7,372,503 B2 | * | 5/2008 | Maeda et al. ................ | 348/376 |
| 2004/0233325 A1 | * | 11/2004 | Lee et al. ..................... | 348/375 |
| 2005/0237425 A1 | * | 10/2005 | Lee et al. ..................... | 348/373 |
| 2006/0077286 A1 | * | 4/2006 | Wenderski .................. | 348/373 |
| 2007/0003274 A1 | | 1/2007 | Sukenari | |

FOREIGN PATENT DOCUMENTS

| | | |
|---|---|---|
| JP | 5-236203 | 9/1993 |
| JP | 7-288721 | 10/1995 |

* cited by examiner

*Primary Examiner*—Tuan Ho
*Assistant Examiner*—Don Nguyen
(74) *Attorney, Agent, or Firm*—William L. Androlia; H. Henry Koda

(57) ABSTRACT

A visual presenter includes a camera support arm pivotally mounted on a base and having one end on which a camera is mounted, a pivot support including a bracket, a pivot having one end formed with a male thread, a disc spring fitted with the male thread and a nut brought into threading engagement with the male thread so that the spring is fastened to the bracket by the nut with a result that a brake force is effected and a free stop function is given to the pivot support, and a one-way clutch fitted with the pivot to allow the pivot support to be free against rotation causing the pivot support to stand up and to exert a clutching function against rotation causing the pivot support to lie. The camera support arm is pivotally mounted on the pivot support with the one-way clutch being interposed between them.

3 Claims, 10 Drawing Sheets

VISUAL PRESENTER

CROSS-REFERENCE TO RELATED APPLICATIONS

This application is based upon and claims the benefit of priority from the prior Japanese Patent Application No. 2006-155938, filed on Jun. 5, 2006, the entire contents of which are incorporated herein by reference.

BACKGROUND OF THE INVENTION

1. Field of the invention

The present invention relates to a visual presenter in which a pickup image of document placed on a stage of a base thereof is displayed on a monitor, a screen or the like.

2. Description of related art

Conventional visual presenters comprise a base having a stage on which document to be presented is placed and an image pickup camera mounted on a distal end of a camera support arm which is pivotally mounted the base. The camera support arm is caused to pivot so as to be moved from a storage location where the camera support arm lies to a setup location where the camera support arm stands up. The conventional visual presenters include a type in which a spring force is caused to act as an assisting force in order that a force applied to the camera support arm may be reduced when the camera support arm is caused to stand up. JP-A-H05-236203 discloses one of aforesaid type visual presenter, for example. Furthermore, another type of visual presenter is provided with a free stop function that can retain the cameral support arm at any location. JP-A-H07-288721 discloses one of this type visual presenter, for example.

However, the camera support arm cannot be retained at any location in the case of the type that the spring force acts as the assisting force. On the other hand, the type with the free stop function necessitates a large force to cause the camera support arm to pivot.

SUMMARY OF THE INVENTION

Therefore, an object of the present invention is to provide a visual presenter which can reduce a force applied when the camera support arm is moved from the storage location where the camera support arm lies to the setup location where the camera support arm stands up and which is provided with the free stop function effected when the camera support arm is caused to lie.

The present invention provides a visual presenter comprising an image pickup camera, a base having an upper surface on which a stage is formed, a camera support arm pivotally mounted on the base and having a distal end on which the image pickup camera is mounted, a pivot support including a support arm retaining bracket, a pivot having one end extending from the bracket and formed with a male thread, a disc spring fitted with the male thread and a nut brought into threading engagement with the male thread so that the disc spring is fastened to the bracket by the nut with a result that a predetermined brake force is effected and a free stop function is given to the pivot support, and a one-way clutch fitted with the pivot to allow the pivot support to be free against rotation causing the pivot support to stand up and to exert a clutching function against rotation causing the pivot support to lie, the camera support arm being pivotally mounted on the pivot support with the one-way clutch being interposed therebetween.

According to the above-described construction, the disc spring fitted with the pivot end is fastened by the nut so that the brake force is effected and the free stop function is given to the pivot support. The one-way clutch is fitted with the pivot to allow the pivot support to be free against rotation causing the pivot support to stand up and to exert a clutching function against rotation causing the pivot support to lie. The camera support arm is pivotally mounted on the pivot support with the one-way clutch being interposed therebetween. Consequently, an applied force can be reduced when the camera support arm is moved from a storage location where the camera support arm lies to the setup location where the camera support arm stands up. The camera support arm can be retained at any location by the free stop function when caused to lie.

BRIEF DESCRIPTION OF THE DRAWINGS

Other objects, features and advantages of the present invention will become clear upon understanding of the description of embodiments with reference to the accompanying drawings, in which:

FIG. 5 is a side view of the visual presenter, showing the slide support arm brought in;

DETAILED DESCRIPTION OF THE INVENTION

Figure 1:
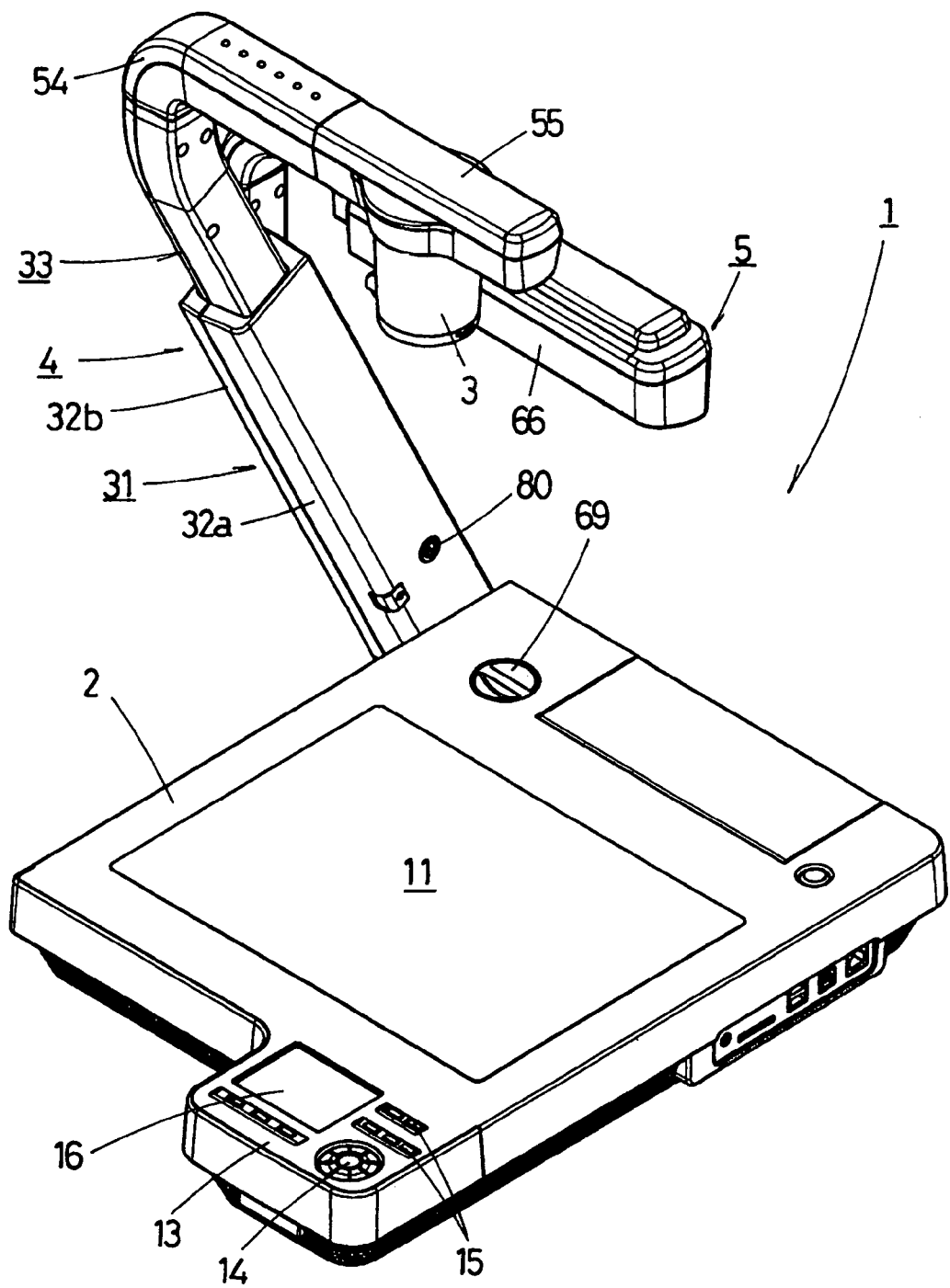
FIG. 1 is a perspective view of a visual presenter in accordance with one embodiment of the present invention, showing a set-up state.

One embodiment of the present invention will be described with reference to the accompanying drawings. Referring to FIG. 1, a visual presenter of the embodiment is shown. The visual presenter 1 comprises a base 2, an image pickup camera 3, a camera support arm 4, an illumination lamp 5 and a lamp support arm 6. The base 2 has a rectangular shape and includes an upper surface formed with a stage 11 on which a document to be presented is placed. A pivot support 12 is mounted on a rear left corner of the base 2 to cause a camera support arm 4 to pivot to a storage location where the camera support arm 4 lies and a setup location where the camera support arm 4 stands up. The base 2 further includes an operation panel 13 located diagonally opposite to the pivot support 12 and projecting frontward. On an upper surface of the operation panel 13 are provided a zooming dial 14 incorporated with an auto-focus button various operation buttons and a liquid crystal panel 16.

Figure 3:
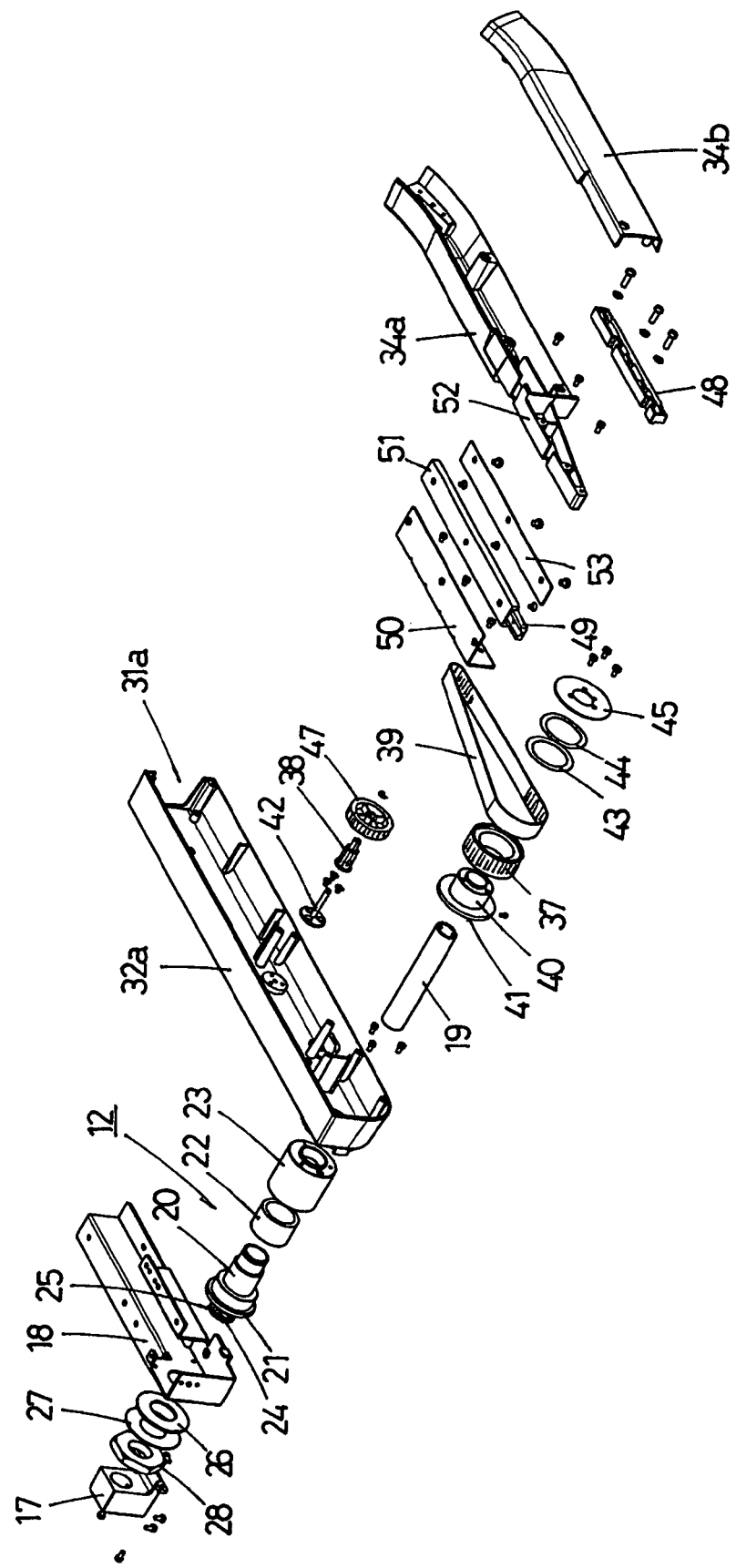
FIG. 3 is a partially eliminated exploded perspective view of a camera support arm.

Referring now to FIG. 3, the pivot support 12 includes a support arm retaining bracket 18 fixed to the base 2, a central pivot part 20 fitted into the bracket and a pivot end 24 protruding from the bracket. A disc spring 26 and a washer 27 are fitted with the pivot end 24. A stuffing nut 28 is brought into threading engagement with a male screw 25 provided on an outer circumference of the pivot end 24 so that the central pivot part 20 is fastened to the bracket 18. The central pivot part 20 has the other end in which a support arm pivot 23 incorporated with a one-way clutch 22 is fitted. Furthermore, a central pivot 19 is fitted in the center of the pivot part 20. The central pivot 19 has an end held on the bracket 18 by a pivot holder 17. In the aforesaid pivot support 12, the nut 28 is tightened such that the disc spring 26 is flexed, whereupon a washer 27 and a flange 21 of the central pivot part 20 are fastened to the bracket 18. As a result, a predetermined brake force acts between the washer 27 and the bracket 18 and between the flange 21 of the central pivot part 20 and the bracket 18. In this state, the central pivot part 20 is pivotable relative to the bracket 18.

Figure 4:
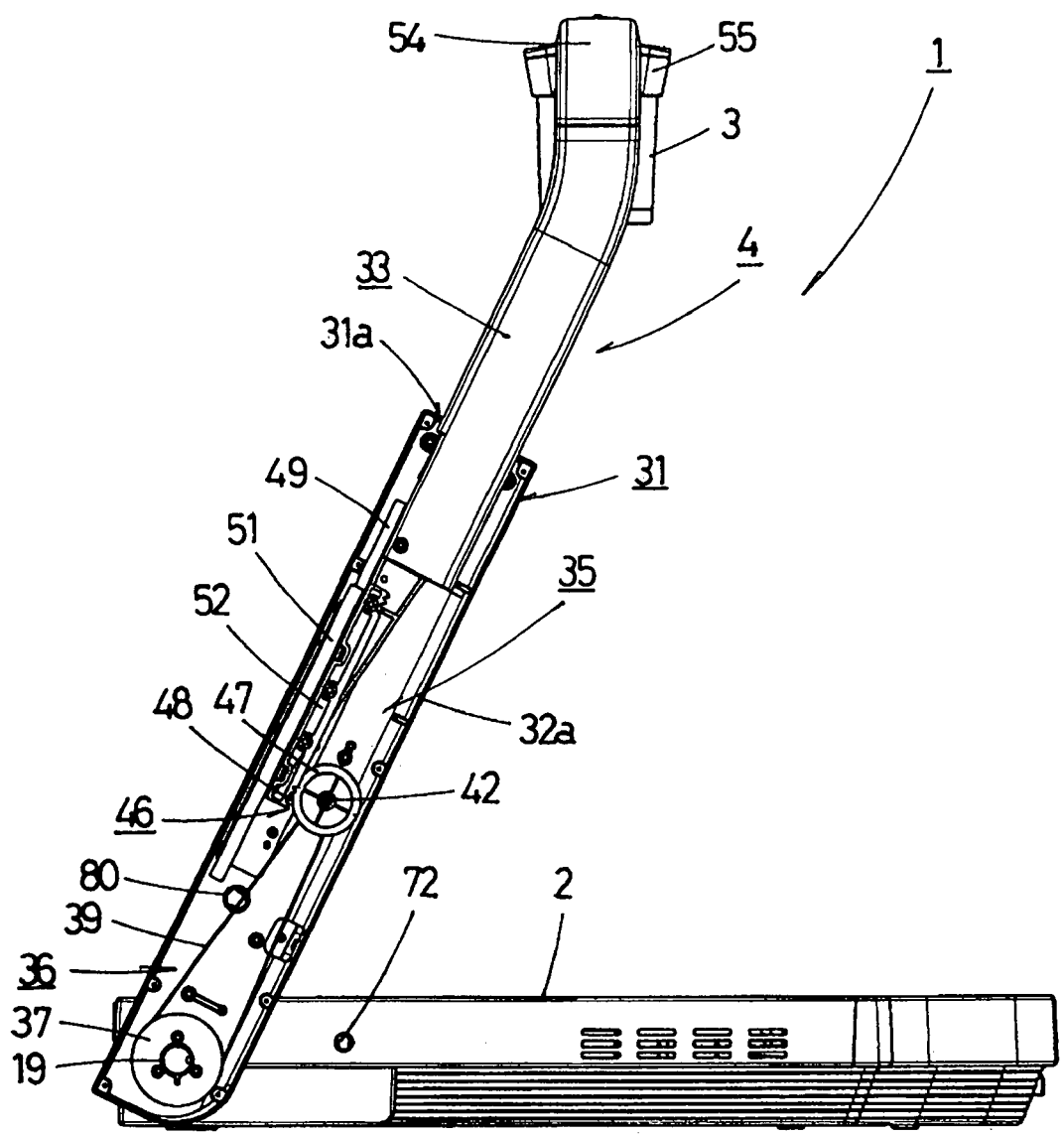
FIG. 4 is a side view of the visual presenter, showing a slide support arm pushed out.

The camera support arm 4 comprises a pivot support arm 31 and a slide support arm 33 as shown in FIG. 4. The pivot support arm 31 comprises support arm covers 32a and 32b and is fastened to the support arm pivot 23. The slide support arm 33 comprises support arm covers 34a and 34b and is slidably inserted through a distal opening 31a into the pivot support arm 31. Furthermore, a sliding mechanism 35 sliding the slide support arm 33 is incorporated in the pivot support arm 31. The sliding mechanism 35 comprises a belt transmission 36, a gear rack part 46 and a slider 49.

Figure 5:
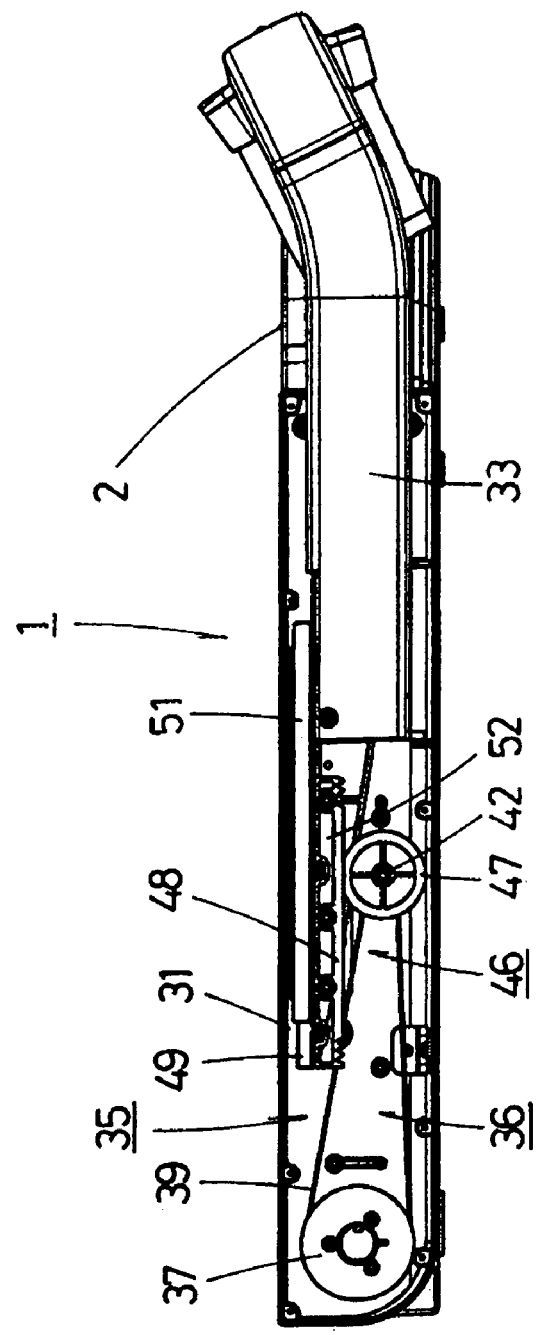

The belt transmission 36 comprises a larger-diameter gear 37, smaller-diameter gear 38 and a toothed belt 39 extending between these gears 37 and 38 as shown in FIGS. 4 and 5. The larger-diameter gear 37 is rotatably fitted into a gear shaft support arm 40 which is inserted through the central pivot 19 further extending through the pivot support arm 31. The gear shaft support arm 40 has a flange 41 formed integrally thereon. The smaller-diameter 38 is rotatably mounted on a gear shaft 42 mounted on the support arm cover 32a. Through the gear shaft support arm 40 are inserted a washer 43, a disc washer 44 and a retainer plate 45. The retainer plate 45 is fastened to the flange 41 of gear shaft support arm 40 such that the disc washer 44 is flexed, whereby a predetermined brake force is exerted on the larger-diameter gear 37. As a result, the larger-diameter gear 37 and the gear shaft support arm 40 are adapted to be rotated relative to each other. The gear rack part 46 includes a gear 47 coaxially mounted on the smaller-diameter gear 38 which is rotatably inserted into the gear shaft 42. The gear rack part 46 further includes a rack 48 mounted on the slider 49 which will be described later.

A rail holder 50 is fixed to the support arm cover 32a. A guide rail 51 which guides the slider 49 is mounted on the rail holder 50. The slider 49 is guided by the guide rail 51 thereby to be slid along the pivot support arm 31. The slider 49 is coupled via a slider holder 53 to a coupling part 52 formed on a proximal end of the support arm cover 34a of the slide support arm 33. The rack 48 of the gear rack part 46 is mounted on the coupling part 52 so as to be in mesh engagement with the gear 47. A right-angle bent part 54 is formed integrally on a distal end of the slide support arm 33. The right-angle bent part 54 has a distal end provided with a horizontal pivot part (not shown) on which a camera support 55 to which the image pickup camera 3 is mounted is further mounted. When the image pickup camera 3 assumes a setup location where it stands up, the camera support 55 faces an upper part of the stage 11 provided on the upper surface of the base 2, automatically setting up the image pickup camera 3 at a predetermined location.

Figure 6:
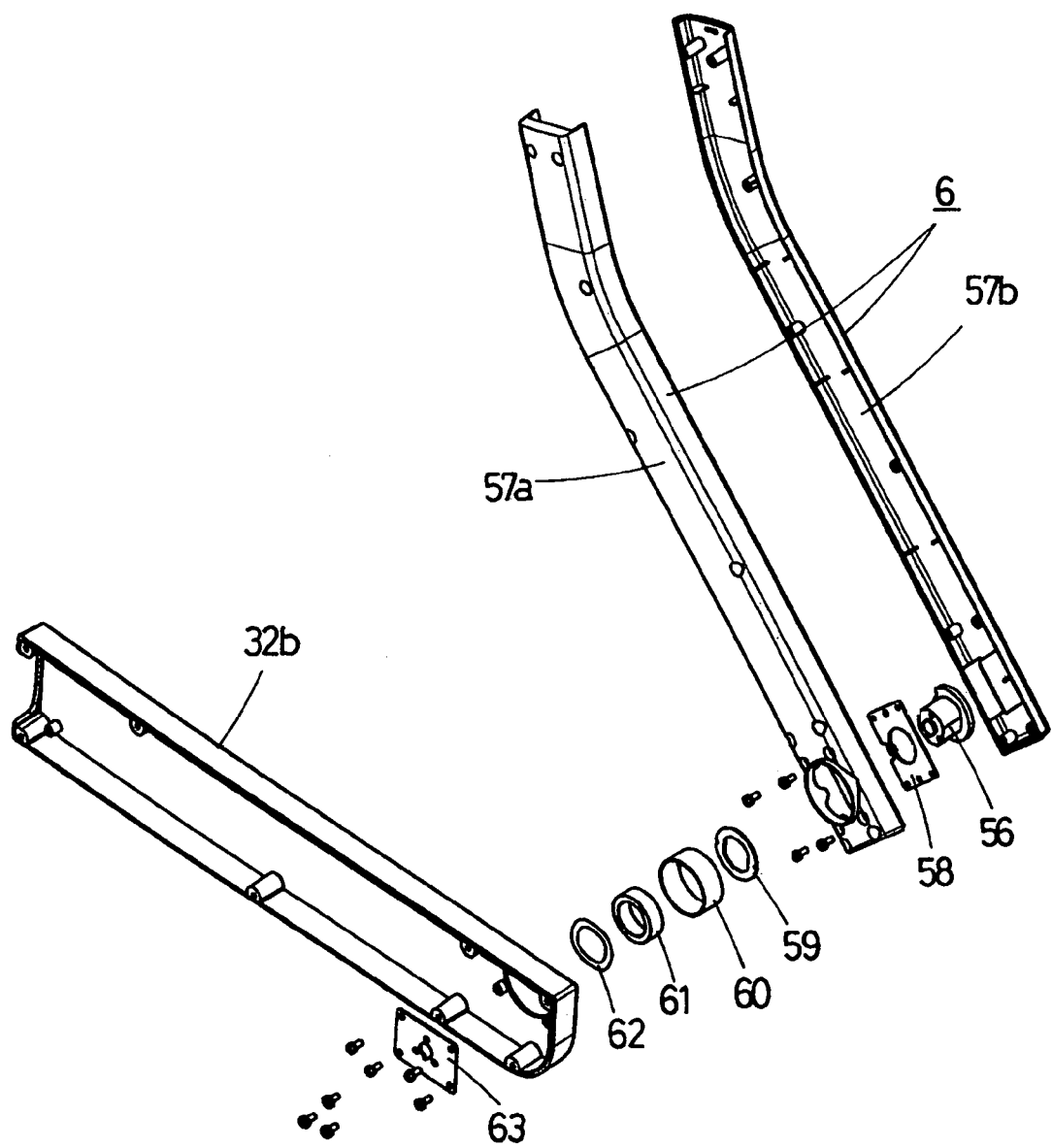
FIG. 6 is a partially eliminated exploded perspective view of an illumination lamp support arm.

Referring now to FIG. 6, the lamp support arm 6 is pivotally mounted on a shaft 56 further mounted on a side of the pivot support arm 31. The lamp support arm 6 comprises support arm covers 57a and 57b. The shaft 56 is mounted on a shaft support plate 58 fixed to the support arm cover 57a. Through the shaft 56 are inserted a spacer 59, a shaft cover 60, a spacer 61 and a wave washer 62 sequentially in this order. The shaft 56 has an end fastened to a retainer plate 63 fixed to an inner wall of the support arm cover 32b of the pivot support arm 31. As a result, the wave washer 62 is pressed such that a predetermined brake force is effective against pivot of the pivot support arm 31 and the lamp support arm 6 relative to each other. Thus, the lamp support arm 6 can be retained at any angle. This is referred to as "free stop function."

Figure 7:
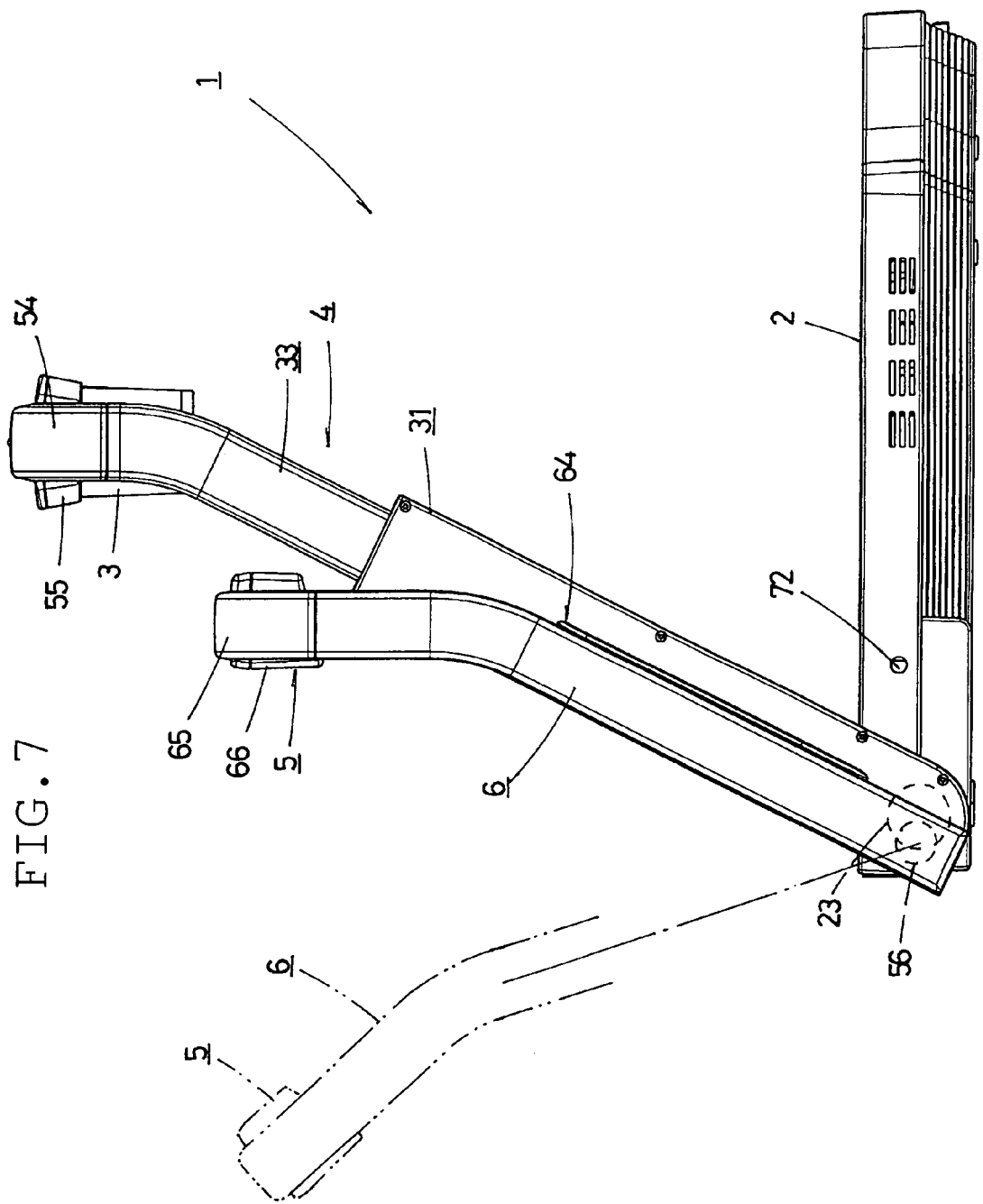
FIG. 7 is a side view of the visual presenter, showing a set-up state of the visual presenter.

Referring FIG. 7, the lamp support arm 6 is abutted against a protrusion 64 provided on the side of the support arm cover 32b thereby to be pushed, so that the lamp support arm 6 is caused to pivot in synchronization with the pivot support arm 31, standing up. The lamp support arm 6 has a distal end formed integrally with a right-angle bent part 65. An illumination lamp chamber 66 is defined in the right-angle bent part 65. When the pivot support arm 31 assumes the setup location where the camera support arm 4 stands up, the lamp chamber 66 is adapted to face an upper part of the stage 11 provided on the upper surface of the base 2, assuming a location slightly lower than the rear side of the image pickup camera 3 set up or the side toward which the camera support arm 4 is caused to pivot thereby to stand up. Accordingly, the lamp chamber 66 has an illuminating window 67 which is inclined so that a front 67a is located higher than a rear 67b in order that a central part of the stage 11 may be illuminated (see FIG. 8).

Figure 9:
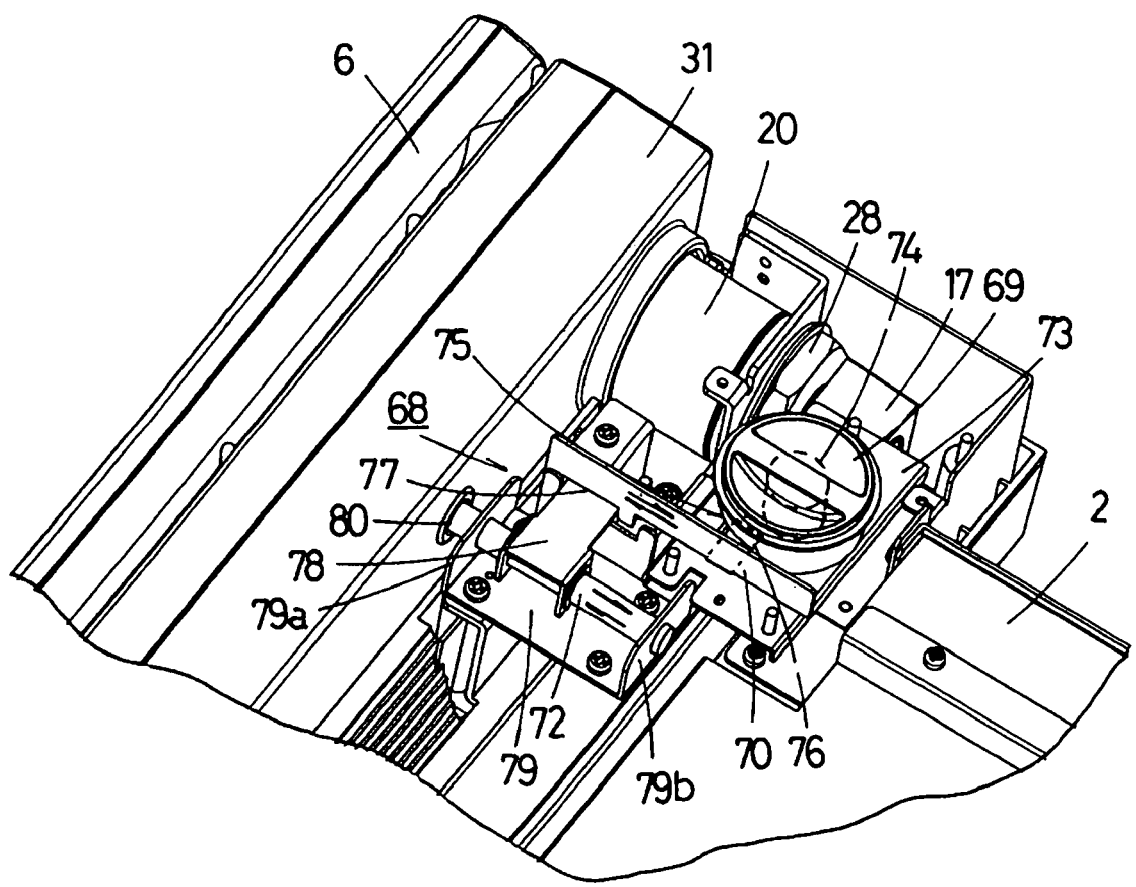
FIG. 9 is a plan view of a locking mechanism.
Figure 10:
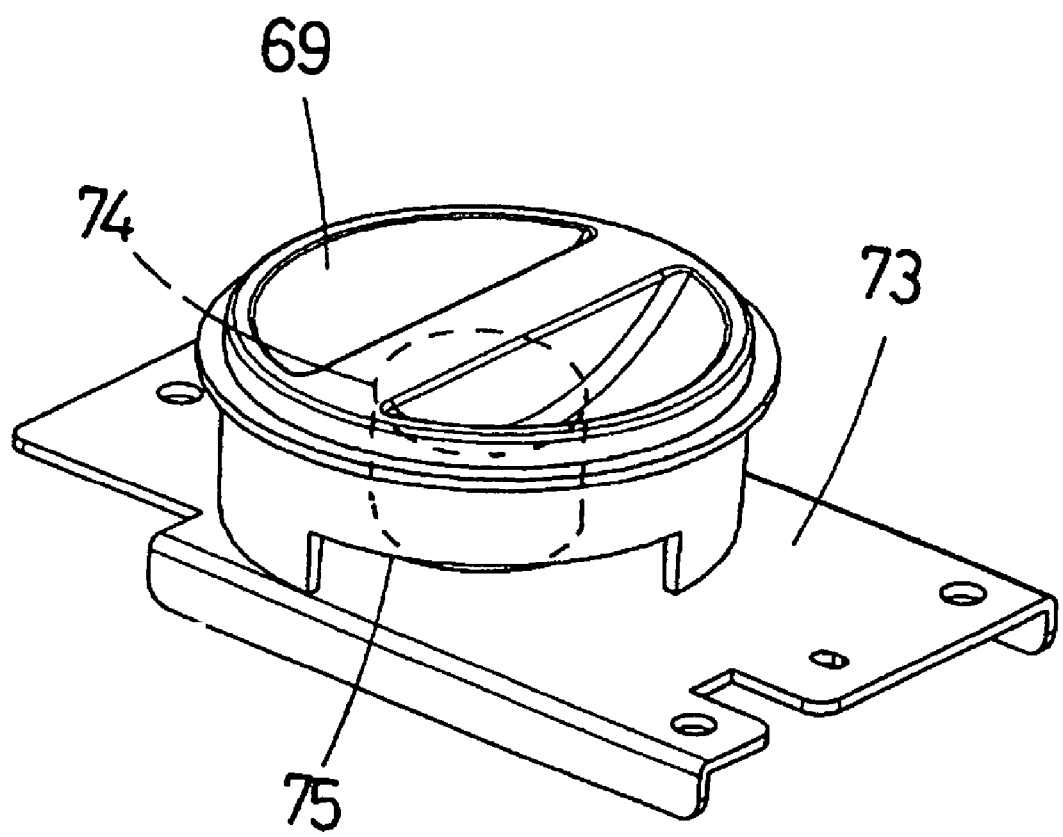
FIG. 10 is a perspective view of an operation dial.

A locking mechanism 68 for locking the pivot support arm 31 is provided in he base 2 so as be adjacent to the central pivot part 20 of the pivot support arm 31 as shown in FIG. 9. The locking mechanism 68 retains the pivot support arm 31 at a storage location when the arm has been caused to pivot thereby to lie. The locking mechanism 68 comprises an operation dial 69, an actuating member 70, an engaging member 71 and a lock pin 72. The operation dial 69 is mounted on a vertical shaft 74 provided on the bracket 73 so as to be caused to pivot a predetermined angle. The operation dial 69 appears on the upper surface of the base 2. The operation dial 69 has an engagement notch 75 formed in the underside thereof. The actuating member 70 includes an engaging piece 76 engaging the notch 75 so that the actuating member 70 is reciprocated by the pivoting of the operation dial 69. The actuating member 70 is guided by a guide (not shown) provided on the bracket 73. The actuating member 70 is formed with an engagement notch 77 which is engaged with a synchronizing piece 78 fixed to the lock pin 72.

The lock pin 72 is supported between shaft support pieces 79a and 79b provided on the bracket 79 so as to be moved in parallel with the direction in which the actuating member 70 is moved. When the operation dial 69 is caused to pivot, the distal end of the lock pin 72 protruding from the side of base 2 is inserted into a lock hole 80 of the pivot support arm 31 in synchronization with the moving actuating member 70, thereby bring locked in position. The distal end of the lock pin 72 is adapted to correspond to the lock hole 80 when the pivot support arm 31 assumes the storage location.

The above-described pivot support 12, the pivot holder 17, the central pivot 19, the central pivot part 20, the one-way clutch 22, the support arm pivot 23 are each hollow. Each of the retainer plates 45 and 63 have respective central through holes so that wiring harness can be inserted through the holes for the purpose of ensuring electrical connection.

A control unit (not shown) is provided in the base to execute a predetermined control manner based on operation of various operation buttons 15 and the like on the operation panel 13. Electrical connection can be ensured by wiring harness between the control unit and a control circuit unit (not shown) of the image pickup camera 3. The wiring harness is inserted through the hollow pivot support 12, central pivot 19, one-way clutch 22 and the like sequentially and arranged in the pivot support arm 31, the slide support arm 35 and the lamp support arm 6. Furthermore, various connecting sockets and the like are provided on the rear and sides of the base 2 for connection to a power supply and external equipment.

Figure 2:
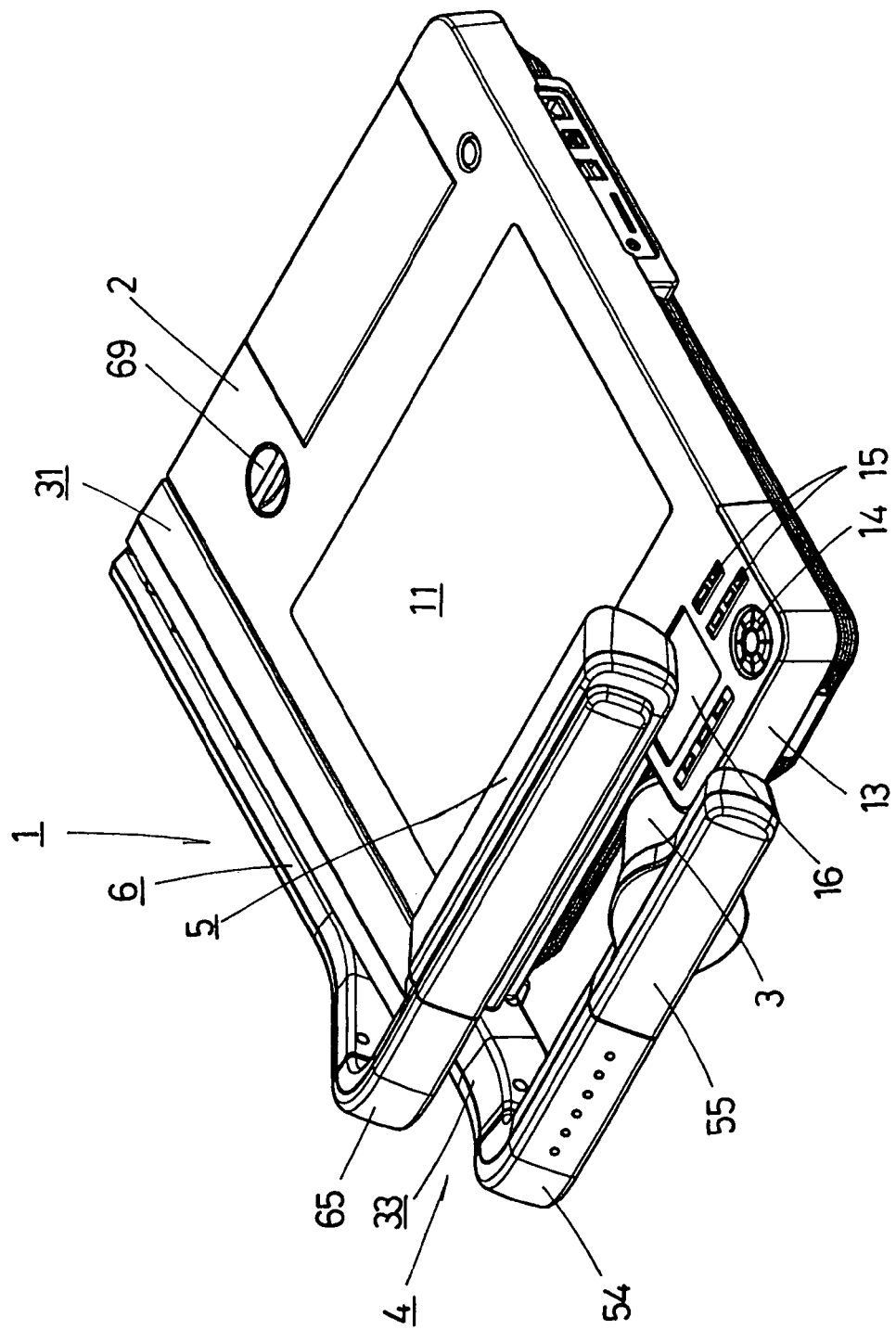
FIG. 2 is a perspective view of the visual presenter in a storage state.

The operation of the visual presenter 1 will now be described. When the visual presenter 1 is in the storage state, both camera and lamp support arms 4 and 6 lie over the left side of the base 2, as shown in FIG. 2. The right-angle bent part 54 and camera support 55 of the camera support arm 4 lie over the front of the base 2. The image pickup camera 3 mounted on the camera support 55 is located in a space defined by the front of the base 2 and a side of the operation panel 13. The right-angle bent part 65 in which the lamp chamber 66 is located over a front part of the upper surface of the base 2.

The visual presenter 1 will be transferred from the above-described storage state to the setup state as follows. Firstly, when locked at the storage location by the locking mechanism 68, the camera support arm 4 is unlocked. In this case, the operation dial 69 is caused to pivot so that the actuating member 70 is moved. The distal end of the lock pin 72 is withdrawn from the lock hole 80 into the base 2 by a synchronizing member (not shown) operable in synchronization with the actuating member 70. Subsequently, the pivot support arm 31 of the camera support arm 4 is caused to pivot thereby to stand up. The pivot support arm 31 is formed with the protrusion 64 on the side of the support arm cover 32*b*. The lamp support arm 6 abuts against and pushes the protrusion 64, thereby being caused to pivot.

The support arm pivot 23 of the pivot support arm 31 is fitted in the one-way clutch 22 further fitted in the central pivot part 20 of the pivot support 12. The one-way clutch 22 is set so as to be free against rotation which stands up the pivot support arm 31. Accordingly, the camera support arm 4 can be caused to stand up by a relatively smaller force. On the other hand, the one-way clutch 22 fulfills the clutching function against rotation which causes the pivot support arm 31 to lie. Accordingly, when the pivot support arm 31 is caused to lie, the central pivot part 20 is rotated relative to the bracket 18 against the brake force by the clutching function of the one-way clutch 22. The camera support arm 4 can be retained at any angle by the free stop function due to frictional resistance at this time.

Upon the pivoting of the pivot support arm 21, the sliding mechanism 35 is actuated to slide the slide support arm 33. The larger-diameter gear 37 of the belt transmission 36 of the sliding mechanism 35 is rotatably fitted in the gear shaft support 40 which is inserted through the central pivot 19 further extending through the pivot support arm 31. When the pivot support arms 21 is caused to pivot in the standing direction, the larger-diameter gear 37 and the gear shaft support 40 are caused to pivot in the direction opposed to the pivoting direction of the pivot support arm 21. The rotation is transmitted by the toothed belt 39 to the smaller-diameter gear 38, which is rotated in the same direction as the larger-diameter gear 37. The rack 48 of the gear rack 46 is moved by rotation of the gear 47. Since the rack 48 is mounted on the slider holder 53 of the slide support arm 33 to which the slider 49 is coupled, the slide support arm 33 is pushed out of the distal opening 31*a* of the pivot support arm 21, whereupon the image pickup camera 3 is automatically set up at a predetermined location (see FIG. 4).

When the pivot support arm 21 is to be caused to lie, the larger-diameter gear 37 and the gear shaft support 40 are caused to pivot in the direction opposed to the pivoting direction of the pivot support arm 21, whereby the slide support arm 33 is automatically drawn into the pivot support arm 21 (see FIG. 5). When the visual presenter is subjected to an unexpected external force that slides the slide support arm 33, the larger-diameter gear 37 and the gear shaft support 40 are rotated relative to each other so that the toothed belt 39 is prevented from being overloaded, whereby the toothed belt 39 is prevented from breakage.

Figure 8:
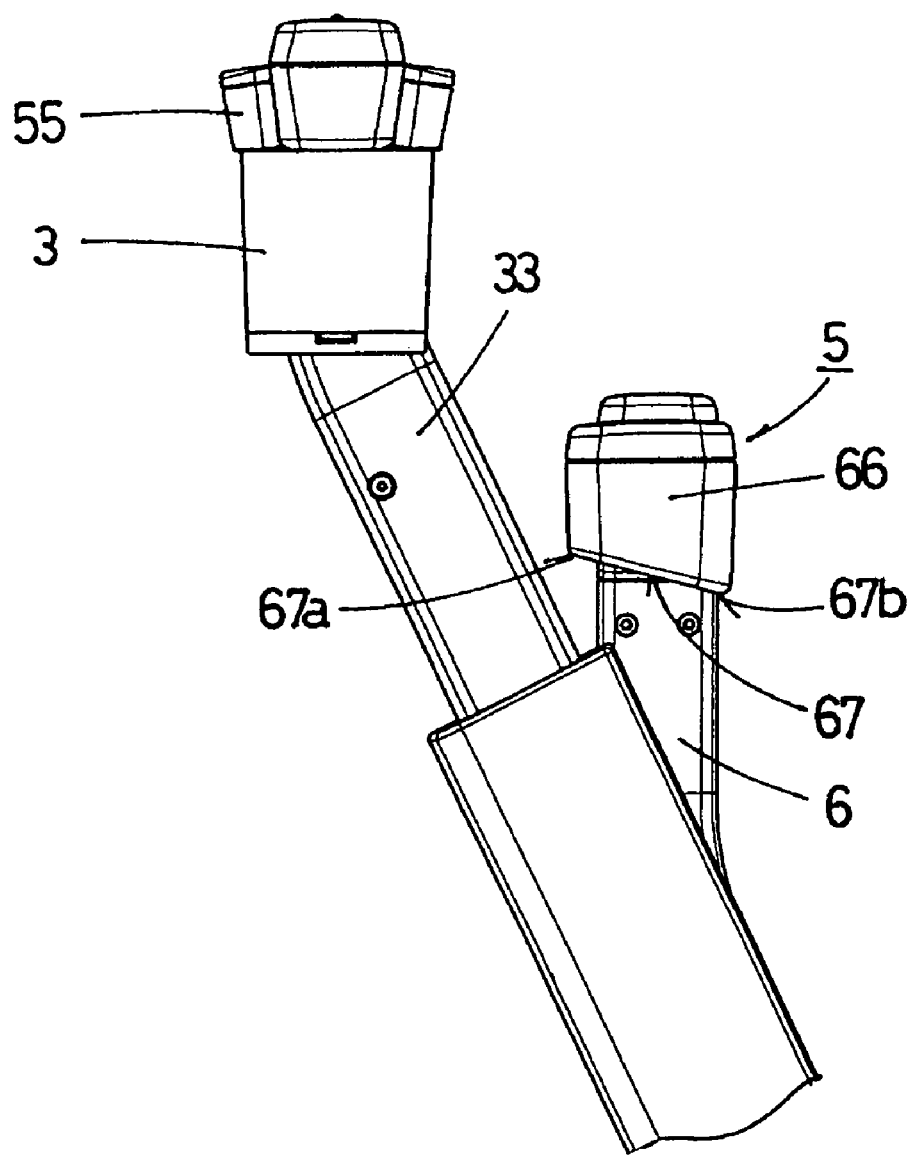
FIG. 8 is a side view of the image pickup camera and an illumination lamp chamber in the set-up state.

Furthermore, when the camera support arm 4 stands up, the lamp support arm 6 stands up synchronously. When the pivot support arm 21 assumes the setup location, the lamp chamber 66 is located in the rear of the image pickup camera 3 so as to be slightly lower than the image pickup camera 3. Since the illuminating window 67 of the lamp chamber 66 is inclined so that the front 67*a* thereof is located higher than the rear 67*b* thereof, the central part of the stage 11 can be illuminated as shown in FIG. 8. Additionally, when a presentation is conducted using the visual presenter 1, the operation panel 13 faces a presenter's side, the illuminating window 67 is out of sight of audience. Consequently, the audience can be prevented from dazzle.

The lamp support arm 6 operable in synchronization with the pivot support arm 21 comprises the shaft 56 which is inserted through the spacer 59, the shaft cover 60, the spacer 61 and the wave washer 62. Since the wave washer 62 is pressed, the predetermined brake force is applied to the lamp support arm 6 when the pivot support arm 31 is caused to pivot relative to the lamp support arm 6. Thus the lamp support arm 6 has the free stop function. Consequently, the lamp support arm 6 can be located at any location in the rear of the camera support arm 4.

When the pivot support arm assumes the storage location where the camera and lamp support arms 4 and 6 lie, the operation dial 69 is turned so that the lock pin 72 is engaged into the lock hole 80 formed in the pivot support arm 31 to be locked. As a result, the image pickup cameras can be prevented from inadvertent pivoting during transportation of the visual presenters.

As obvious from the foregoing description, the disc spring 26 and the washer 27 both fitted with the pivot end 24 are fastened by the nut 25 so that the brake force is effected and the free stop function is given to the pivot support 12. The one-way clutch 22 is fitted with the pivot 23 to allow the pivot support 12 to be free against rotation causing the pivot support 12 to stand up and to exert a clutching function against rotation causing the pivot support 12 to lie. The camera support arm 4 is pivotally mounted on the pivot support 12 with the one-way clutch 22 being interposed therebetween. Consequently, an applied force can be reduced when the camera support arm 4 is moved from a storage location where the camera support arm 4 lies to the setup location where the camera support arm 4 stands up. The camera support arm 4 can be retained at any location by the free stop function when caused to lie.

The foregoing description and drawings are merely illustrative, of the principles of the present invention and are not construed in a limiting sense. Various changes and modifications will become apparent to those of ordinary skill in the art. All such changes and modifications are seen to fall within the scope of the invention as defined by the appended claims.

What is claimed is:

1. A visual presenter comprising:
   an image pickup camera;
   a base having an upper surface on which a stage is formed;
   a camera support arm having one end pivotally mounted on the base and having a distal end on which the image pickup camera is mounted; wherein said one end of camera support arm is pivotally mounted to said base by:
- a pivot support including a support arm retaining bracket, a pivot having one end extending from the bracket and formed with a male thread, a disc spring fitted with the male thread and a nut brought into threading engagement with the male thread so that the disc spring is fastened to the bracket by the nut with a result that a predetermined brake force is effected and a free stop function is given to the pivot support; and
- a one-way clutch fitted with the pivot to allow the pivot support to be free against rotation causing the pivot support to stand up and to exert a clutching function against rotation causing the pivot support to lie, the camera support arm being pivotally mounted on the pivot support with the one-way clutch being interposed therebetween.

2. The visual presenter of claim 1 further comprising a locking mechanism provided in said base for locking said camera support arm in a storage position.

3. The visual presenter of claim 2 further comprising a slide support arm slidably provided in a distal end of said camera support arm and a means for extending and retracting said slide support arm out of and into said camera support arm as said camera support arm is rotated from and mounted to said storage position.

* * * * *